I. F. A. A. LYNCH.
Weather Strip for Doors.
No. 3,202. Reissued Nov. 17, 1868.
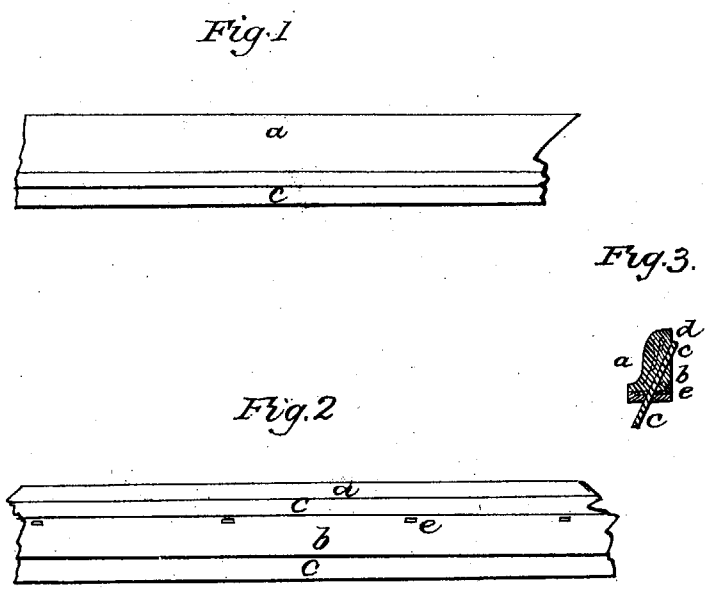
Witnesses
Frederick Curtis
H. P. Hale Jr.
Inventor
Isaac F. A. A. Lynch
by his attorney.
R. K. Eddy
N. PETERS, Photo-Lithographer, Washington, D. C.

United States Patent Office.

BENJAMIN B. SAVARY, OF BOSTON, AND FREDERICK O. RAYMOND, OF HAVERHILL, MASSACHUSETTS, ASSIGNEES, BY MESNE ASSIGNMENTS, OF ISAAC F. A. A. LYNCH.

*Letters Patent No.* 50,016, *dated September* 19, 1865; *reissue No.* 3,202, *dated November* 17, 1868.

IMPROVED WEATHER-STRIP FOR DOORS AND WINDOWS.

The Schedule referred to in these Letters Patent and making part of the same.

*To whom it may concern:*

Be it known that ISAAC F. A. A. LYNCH, of Roxbury, in the county of Norfolk, and State of Massachusetts, has invented an Improved Weather-Strip for Doors or Windows; and the following is hereby declared to be a full, clear, and exact description of the same, reference being had to the accompanying drawings, in which—

Figures 1 and 2 are front and rear views of a weather-strip made in accordance with the said invention.

Figure 3 is a transverse section of the same.

This invention relates to that class of weather-strips in which vulcanized India rubber, or its equivalent, is secured in a strip or moulding of wood, and extends or projects out from it, so that when said moulding is attached, for instance, to the lower part of a door, the projecting strip of India rubber may have its edge resting on the threshold of the door-frame, the purpose of the same being to prevent air and dust from making their way underneath the door, and into the apartment to which such door may belong.

One object of the invention is to produce a weather-strip in which the strip of vulcanized rubber, or other elastic material, may be held more securely and tightly than has heretofore been practicable; and a second object is to so construct the weather-strip that air and dust may be effectually prevented from passing through the joint or crack, between the strip and the door, or other part to which it is affixed.

To this end the invention consists—

First, of a weather-strip, composed of two strips or pieces of wood, or like material, and an interposed projecting strip of rubber, united by tacks, or otherwise, substantially as hereinafter set forth.

Second, in the employment, with a weather-strip, of otherwise ordinary or suitable construction, of India rubber, or equivalent elastic material, held in and arranged to project from that face of the weather-strip in contact with the door, or other part to which said strip is affixed.

Third, in minor features of construction, to be hereinafter described.

The manner in which the invention may be carried into effect is shown in figs. 1 and 2, wherein an elastic strip, *c c*, is interposed and held between two strips or pieces of wood, *a b*, which constitute the moulding or main portion of the weather-strip, the said parts being united by brads or tacks, *e*, or by other suitable means.

It will be seen that the one strip of rubber, *c*, in this case, passes through its holder or moulding, and extends therefrom in opposite directions, so as to project from both faces of the moulding.

The shorter face of the moulding, with its projecting rubber, is designed for the uses to which ordinary weather-strips are put; the longer or rear face of the moulding, from which the rubber also projects, is intended to be laid against the door or other part to which the weather-strip is to be affixed.

The part *a*, of the holder or moulding, should be rebated lengthwise, in rear of the upper external portion of the rubber strip, as shown at *d*, fig. 3, where it will be seen that the whole device is triangular, or nearly so, in section. This rebate, when the weather-strip is laid against a door, and confined thereto by means of screws or like means, enables the said upper external portion of the strip *c* to fall back, and allow the rear of the two parts *a b*, of the moulding, to be brought in close contact with the door.

The upper part of the strip *c*, by its elasticity, will be borne close against the door, and thus prevent any current of air from entering the apartment by passing between the moulding and the door.

By forming the weather-strip of two pieces of wood, or like material, with interposed rubber, or equivalent elastic substance, many advantages are attained.

The rubber, as above shown, may be made to consist of one continuous strip, projecting from both faces of the moulding. And moreover, the operation of fastening the weather-strip to the door, or other part, where it is required, will cause the rubber to be tightly clamped and held between the two pieces of wood, whether the screws, nails, or other fastening-devices employed for the purpose, pass through the rubber or not; for in any event such fastening-devices will bring the two pieces of the moulding tightly together, and thus cause them to grasp and compress the rubber.

In weather-strips in which the wooden moulding consists of one solid piece, grooved to receive the rubber, the latter cannot be thus clamped, but must be held in place by cement, glue, or small brads, which, in themselves, are insufficient to retain it securely in place for any considerable length of time; but by the present invention, so long as the moulding lasts, the rubber is clamped firmly and tightly, and the difficulties heretofore experienced are thus obviated.

What is claimed as the invention of the said ISAAC F. A. A. LYNCH is as follows:

1. A weather-strip, composed of two strips or pieces of wood, and an interposed projecting strip of vulcanized rubber, or equivalent elastic material, united by tacks, or otherwise, substantially as herein set forth.

2. The employment, with a weather-strip of otherwise ordinary or suitable construction, of vulcanized rubber, held in and arranged to project from face of the weather-strip in contact with the door or other part to which said strip is affixed, substantially as and for the purposes herein set forth.

3. The improved weather-strip, as made with the strip of elastic material or India rubber, *c c*, to project in opposite directions from the two faces of the divided holder or moulding *a b*, substantially in the manner shown and described.

4. The combination, with the elastic strip, projecting from the rear face of the moulding, as described of the rebate *d*, made in the moulding, and arranged, with relation to the said elastic strip, substantially as specified.

In testimony whereof, we have hereunto set our hands before two subscribing witnesses.

BEN. B. SAVARY.
FRED. O. RAYMOND.

Witnesses:
F. W. CHOATE,
A. W. ADAMS.